US006506864B1

(12) United States Patent
Daughenbaugh et al.

(10) Patent No.: US 6,506,864 B1
(45) Date of Patent: *Jan. 14, 2003

(54) POLYMERIZABLE COMPOSITION OF ALLYL FUNCTIONAL MONOMERS

(75) Inventors: Randy E. Daughenbaugh, Turtle Creek, PA (US); Robert D. Herold, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,074

(22) Filed: Aug. 1, 2000

Related U.S. Application Data

(63) Continuation-in-part of application No. 09/546,267, filed on Apr. 10, 2000, now abandoned.

(51) Int. Cl.$^7$ .............................................. C08F 116/36
(52) U.S. Cl. .................. 526/314; 526/204; 526/217; 526/220; 526/230.5
(58) Field of Search .......................... 526/204, 217, 526/220, 230.5, 314

(56) References Cited

U.S. PATENT DOCUMENTS

| | | | |
|---|---|---|---|
| 2,370,567 A | 2/1945 | Muskat et al. ............... 260/463 |
| 2,403,113 A | 7/1946 | Muskat et al. ................ 260/78 |
| 3,169,945 A | 2/1965 | Hostettler et al. .......... 260/78.3 |
| 3,361,706 A | 1/1968 | Meriwether et al. ........... 260/39 |
| 3,562,172 A | 2/1971 | Ono et al. .................... 252/300 |
| 3,567,605 A | 3/1971 | Becker ....................... 204/158 |
| 3,578,602 A | 5/1971 | Ono et al. ................... 252/300 |
| 4,144,262 A | 3/1979 | Stevens ....................... 260/463 |
| 4,166,043 A | 8/1979 | Uhlmann et al. ........... 252/300 |
| 4,205,154 A | 5/1980 | Stevens ....................... 526/314 |
| 4,215,010 A | 7/1980 | Hovey et al. ............... 252/300 |
| 4,342,668 A | 8/1982 | Hovey et al. ............... 252/586 |
| 4,346,197 A | 8/1982 | Crano et al. ................. 525/277 |
| 4,367,170 A | 1/1983 | Uhlmann et al. ........... 525/586 |
| 4,398,008 A | 8/1983 | Misura ........................ 526/314 |
| 4,440,909 A | 4/1984 | Crano et al. ................. 525/277 |
| 4,637,698 A | 1/1987 | Kwak et al. ................. 351/163 |
| 4,666,976 A | 5/1987 | Misura ........................ 524/739 |
| 4,742,133 A | 5/1988 | Tang et al. .................. 526/235 |
| 4,816,584 A | 3/1989 | Kwak et al. ................... 344/71 |
| 4,818,096 A | 4/1989 | Heller et al. ................ 351/163 |
| 4,826,977 A | 5/1989 | Heller et al. .................. 544/70 |
| 4,880,667 A | 11/1989 | Welch ......................... 427/160 |
| 4,931,219 A | 6/1990 | Kwiatkowski et al. ....... 252/586 |
| 4,931,220 A | 6/1990 | Haynes et al. ............... 252/586 |
| 5,066,818 A | 11/1991 | Van Gemert et al. ........ 549/389 |
| 5,200,483 A | 4/1993 | Selvig .......................... 526/301 |
| 5,238,931 A | 8/1993 | Yoshikawa et al. .......... 514/184 |
| 5,274,132 A | 12/1993 | Van Gemert ................ 549/389 |
| 5,384,077 A | 1/1995 | Knowles ...................... 252/586 |
| 5,405,958 A | 4/1995 | Van Gemert .................. 544/71 |
| 5,429,774 A | 7/1995 | Kumar ......................... 252/586 |
| 5,466,398 A | 11/1995 | Van Gemert et al. ........ 252/586 |
| 5,973,093 A | 10/1999 | Daughenbaugh et al. ... 526/314 |
| 5,981,634 A | 11/1999 | Smith et al. ................... 524/87 |
| 5,992,997 A | 11/1999 | Kulper et al. ................ 351/159 |

FOREIGN PATENT DOCUMENTS

| | | |
|---|---|---|
| EP | 0472168 | 2/1992 |
| FR | 2674529 | 10/1992 |
| JP | 60231711 | 11/1985 |
| JP | 63260910 | 10/1988 |
| WO | WO 9933887 | 7/1999 |
| WO | WO 9933888 | 7/1999 |
| WO | WO 9938899 | 8/1999 |

OTHER PUBLICATIONS

ASTM D 648–95, Standard Test Method for Deflection Temperature of Plastics Under Flexural Load.
ASTM D 1003–95, Standard Test Method for Haze and Luminous Transmittance of Transparent Plastics.
ASTM D 1925–70 (Reapproved 1988) Standard Test Method for Yellowness Index of Plastics.
ASTM D 2583–92, Standard Test Method for Indentation Hardness of Rigid Plastics by Means of a Barcol Impressor.
*Techniques of Chemistry*, vol. III, PHOTOCHROMISM, Robert C. Bertelson, Chapter III, "Photochromic Processes Involving Heterolytic Cleavage", pp. 45–48, 50–55, 252–254, 399, 842.

*Primary Examiner*—Helen L. Pezzuto
(74) *Attorney, Agent, or Firm*—Carol A. Marmo; James R. Franks

(57) ABSTRACT

Describes a polymerizable composition of (a) a first allyl functional monomer, which is selected such that a substantially completely cured polymerizate of the first allyl functional monomer has a 15 second Barcol 934 hardness of at least 40, and (b) a second allyl functional monomer selected from polyether diol bis(allyl carbonate), polylactone diol bis(allyl carbonate) and mixtures thereof. The second allyl functional monomer is present in the composition in an amount to provide a substantially completely cured polymerizate having: (i) improved organic photochromic substance incorporation relative to a substantially completely cured polymerizate of the composition free of monomer (b); and (ii) heat distortion temperature of at least 40° C.

25 Claims, No Drawings

POLYMERIZABLE COMPOSITION OF ALLYL FUNCTIONAL MONOMERS

CROSS REFERENCE TO RELATED APPLICATION

This a continuation-in-part application claiming priority under 35 USC §120 of U.S. patent application Ser. No. 09/546,267 filed Apr. 10, 2000 now abandoned.

DESCRIPTION OF THE INVENTION

The present invention relates to a polymerizable composition comprising first and second allyl functional monomers. More particularly, the present invention relates to a polymerizable composition of a first allyl functional monomer having at least two allyl groups that is selected such that a polymerizate of the first monomer has a 15 second Barcol 934 hardness of at least 40, and a second allyl functional monomer selected from polyether diol bis(allyl carbonate), polylactone diol bis(allyl carbonate) and mixtures thereof. The present invention also relates to polymerizates prepared from such polymerizable compositions, and photochromic articles prepared from such polymerizates.

Polymerizable organic compositions based on allyl functional monomers, such as polyol(allyl carbonate) monomers, e.g., ethylene glycol bis(allyl carbonate), and poly(allyl ester) monomers, e.g., diallyl isophthalate, and polymerizates obtained therefrom are well known in the art. Polymerizates of allyl functional monomers, such as polyol(allyl carbonate) monomers, possess excellent clarity, hardness and good flexibility, examples of which include, ophthalmic lenses, sunglasses, and automotive and aircraft transparencies.

Recently, photochromic plastic materials, particularly plastic materials for optical applications, have been the subject of considerable attention. In particular, photochromic ophthalmic plastic lenses have been investigated in part due to the weight advantage that they can offer relative to ophthalmic lenses made of inorganic glass. In addition, photochromic transparencies for vehicles, such as automobiles and airplanes, have been of interest because of the weight reduction and potential safety features that such transparencies offer. Photochromism is a phenomenon involving a change in color of a photochromic substance, or an article containing such a substance, upon exposure to light radiation containing ultraviolet rays, and a reversion to the original color when the influence of the ultraviolet radiation is discontinued. Examples of light sources that contain ultraviolet rays include sunlight and the light of a mercury lamp. Discontinuation of the ultraviolet radiation can be achieved, for example, by storing the photochromic substance or article in the dark, by removing the source of ultraviolet radiation or by filtering out the ultraviolet rays from the light source.

Fully cured polymerizates of many allyl functional monomers, e.g., polyol(allyl carbonate) monomers such as ethylene glycol bis(allyl carbonate), are not particularly well suited to the incorporation of organic photochromic substances by diffusion, e.g., by thermal transfer. In some instances, for example in the case of ethylene glycol bis(allyl carbonate), one or more organic photochromic substances may be incorporated by diffusion into an undercured polymerizate, followed by an additional curing step to fully cure the polymerizate having organic photochromic substances incorporated therein. Such two-stage cure processes require extra time and expense, and can result in inconsistent and unreliable incorporation of organic photochromic substances into the polymerizate.

It would be desirable to develop polymerizable compositions of allyl functional monomers that can be used to prepare substantially completely cured polymerizates into which organic photochromic substances may be incorporated. In addition, it would desirable that polymerizates prepared from such newly developed compositions have good physical properties, such as hardness and heat distortion temperature, and that photochromic articles prepared from such polymerizates have good photochromic properties, e.g., as measured by change in optical density (as described in further detail in the examples herein).

U.S. Pat. No. 4,742,133 describes the preparation of a poly(allyl carbonate) functional prepolymers by contacting a liquid monomer composition comprising at least one poly (allyl carbonate) functional monomer with oxygen. The poly(allyl carbonate) functional monomers of the '133 patent are described as including those based on polyhydroxy functional chain extended compounds, such as ethylene oxide extended glycerol and compounds based on lactone extension.

U.S. Pat. No. 4,666,976 describes a polymerizable solution comprising poly(allyl carbonate) monomer, liquid polyol(allyl carbonate) polymer or a mixture thereof, and bromoxylenol blue. The polyols of the polyol(allyl carbonate) monomer and liquid polyol(allyl carbonate) polymer are described in the '976 patent as including polyol-functional chain extended compounds, e.g., ethylene oxide extended glycerol, and compounds based on lactone extension.

U.S. Pat. No. 5,973,093 describes polymerizable organic compositions of a first monomer component which is a polyol(allyl carbonate), and from about 2 to 35 weight percent of a second monomer component which is an alkoxylated bisphenol having acrylate or methacrylate functionality. Substantially completely cured polymerizates prepared from the polymerizable compositions of the '093 patent are described as being used to prepare photochromic articles by incorporating a photochromic substance, e.g., by thermal transfer, into the polymerizate.

In accordance with the present invention there is provided a polymerizable composition comprising:
(a) a first allyl functional monomer having at least two allyl groups, said first allyl functional monomer being selected such that a substantially completely cured polymerizate of said first allyl functional monomer has a 15 second Barcol 934 hardness of at least 40 (as determined in accordance with American Standard Test Method No. D 2583-92 using a Model No. 934 Barcol Impressor); and
(b) a second allyl functional monomer, which is different from said first allyl functional monomer and is selected from,
(i) polyether diol bis(allyl carbonate);
(ii) polylactone diol bis(allyl carbonate); and
(iii) mixtures of (i) and (ii),
wherein said second allyl functional monomer (b) is present in said polymerizable composition in an amount to provide (i') a substantially completely cured polymerizate of said composition having improved organic photochromic substance incorporation (as determined by measuring Net Absorbance at a wavelength of 390 nanometers, and as will be described further herein) relative to a substantially completely cured polymerizate of said composition free of (b), and (ii') heat distortion temperature of at least 40° C. (as determined in accordance with American Standard Test Method No. D 648-86, at a deflection of 254 microns).

DETAILED DESCRIPTION OF THE INVENTION

Substantially completely cured polymerizates of the polymerizable composition of the present invention have improved organic photochromic substance incorporation, relative to substantially completely cured polymerizates prepared from the first allyl functional monomer alone in the absence of the second allyl functional monomer. As used herein and in the claims the term "substantially completely cured polymerizate" means a polymerizate that has been cured to an extent such that additional exposure to cure conditions, e.g., thermal cure, will not result in a substantial improvement in physical properties, e.g., hardness and heat distortion temperature, (i.e., a polymerizate that is not under- or partially cured).

Organic photochromic substances may be incorporated into the polymerizates of the present invention by methods that are well known to the skilled artisan. Typically, organic photochromic substances are incorporated into the polymerizate by means of a process of diffusion or imbibition, which involves applying a solution of the organic photochromic substance to least a portion of the polymerizate followed by heating for a given amount of time, e.g., 135° C. for 5 hours. While in contact with the applied organic photochromic solution, photochromic substance diffuses into and is retained within the polymerizate. Upon completion of the heating step, excess photochromic solution is rinsed off of the surfaces of the polymerizate.

To determine that polymerizates according to the present invention have improved photochromic substance incorporation, Net Absorbance at a wavelength of 390 nanometers (nm) is calculated. The determination of Net Absorbance involves measuring the absorbance (at 390 nm) of the polymerizate prior to imbibition of photochromic substance, and subtracting this value from the measured absorbance (at 390 nm) of the photochromic imbibed polymerizate while in the bleached state. The term "bleached state" refers to the photochromic imbibed polymerizate being in a non-activated or non-colored state. Absorbance measurements are taken at room temperature from polymerizates of equivalent thickness using a spectrophotometer, e.g., a Varian Model Cary 3 spectrophotometer. A Net Absorbance value of zero would indicate that no photochromic substance had been incorporated into the polymerizate. While Net Absorbance values can vary with the type and combinations of organic photochromic substances that are incorporated into the polymerizate, Net Absorbance values of at least 0.3, e.g., at least 1.0, are considered generally to be acceptable.

As used herein and in the claims, the term "allyl" and related terms (e.g., "allyl functional monomer" and "allyl group") refers to unsubstituted and substituted allyl groups represented by the following general formula I, $$H_2C=C(R_5)-CH_2- \hspace{2cm} I$$

wherein $R_5$ is hydrogen, halogen (e.g., chlorine or bromine) or a $C_1-C_4$ alkyl group (e.g., methyl, ethyl, n-propyl, iso-propyl, n-butyl, sec-butyl and tert-butyl). Most commonly, $R_5$ is hydrogen and the allyl group represented by general formula I is an unsubstituted allyl group, 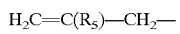

The first allyl functional monomer of the composition of the present invention has at least two allyl groups, e.g., from 2 to 6 allyl groups. Preferably, the first allyl functional monomer has 2 allyl groups. More particularly, the allyl groups of the first allyl functional monomer are selected from allyl carbonate groups, allyl ester groups and combinations thereof. The first allyl functional monomer or mixture of first allyl functional monomers is selected such that a substantially completely cured polymerizate thereof has a 15 second Barcol 934 hardness of at least 40, e.g., from 40 to 70. Typically, the 15 second Barcol 934 hardness of a substantially completely cured polymerizate prepared from the first allyl functional monomer or mixture of first allyl functional monomers is from 43 to 60.

In an embodiment of the present invention, the first allyl functional monomer (a) is selected from, (a)(i) an allyl functional monomer represented by the following general formula II,

wherein R is a divalent residue of a diol selected from 1,2-ethane diol (ethylene glycol) and 1,2-propane diol (propylene glycol), and $R_{14}$ is an allyl group (e.g., a substituted or unsubstituted allyl group as described previously herein with reference to general formula I);

(a)(ii) an allyl functional monomer represented by the following general formula III,

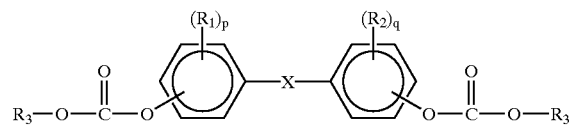

wherein $R_1$ and $R_2$ are each selected independently from each other and independently for each p and q from $C_1-C_4$ alkyl (e.g., methyl, ethyl, n-propyl, iso-propyl, n-butyl, sec-butyl and tert-butyl), chlorine and bromine, p and q are each independently an integer from 0 to 4, and —X— is a divalent linking group selected from —O—, —S—, —S($O_2$)—, —C(O)—, —$CH_2$—, —CH=CH—, —C($CH_3$)$_2$—, —C($CH_3$)($C_6H_5$)— and

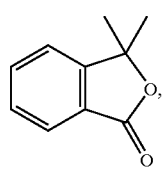

and $R_3$ is an allyl group (e.g., a substituted or unsubstituted allyl group as described previously herein with reference to general formula I);

(a)(iii) an allyl functional monomer represented by the following general formula IV,

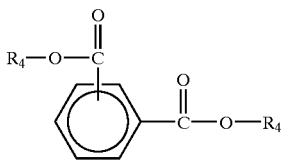

wherein $R_4$ is an allyl group (e.g., a substituted or unsubstituted allyl group as described previously herein with reference to general formula I); and (a)(iv) mixtures at least two of (a)(i), (a)(ii) and (a)(iii).

In an embodiment of the present invention, the first allyl functional monomer (a)(ii) is 4,4'-isopropylidenebisphenol bis(allyl carbonate), which can be described with reference to general formula III, wherein R, and $R_2$ are each hydrogen, —X— is —C(CH$_3$)$_2$—, $R_3$ is an unsubstituted allyl group, and the allyl carbonate groups ($R_3$—O—C(O)—O—) are located at the 4 and 4' positions relative to the divalent linking group —X—. In a further embodiment of the present invention, the first allyl functional monomer (a)(iii) is diallyl isophthalate, which can be described with reference to general formula IV, wherein $R_4$ is an unsubstituted allyl group, and the allyl ester groups ($R_4$—O—C(O)—) are located at the 1 and 3 positions of the aromatic ring.

In a preferred embodiment of the present invention, the first allyl functional monomer is allyl functional monomer (a)(i) represented by general formula II. In a particularly preferred embodiment of the present invention, the first allyl functional monomer is allyl functional monomer (a)(i), wherein R of general formula II is a residue of 1,2-ethane diol (ethylene glycol) and $R_{14}$ is an unsubstituted allyl group, in which case the first allyl functional monomer is ethylene glycol bis(allyl carbonate). As used herein and in the claims, with reference to the first allyl functional monomer, the terms polyol(allyl carbonate) monomer and poly(allyl ester) monomer and more specific related terms (e.g., ethylene glycol bis(allyl carbonate), 4,4'-isopropylidenebisphenol bis(allyl carbonate) and diallyl isophthallate) are intended to mean and include the named monomer or prepolymers thereof and any related monomer or oligomer species and any synthetic coproducts contained therein.

The polyol(allyl carbonate) monomers of the first allyl functional monomer may be prepared by procedures well known in the art, e.g., as described in U.S. Pat. Nos. 2,370,567 and 2,403,113. For example, an aliphatic polyol, such as ethylene glycol, is reacted with phosgene at temperatures typically between 0° C. and 20° C. to form the corresponding polychloroformate, e.g., ethylene bis (chloroformate). The polychloroformate is then reacted with a substituted or unsubstituted allyl alcohol in the presence of a suitable acid acceptor, e.g., an alkali metal hydroxide. Alternatively, an allyl or substituted allyl chloroformate (formed from the reaction of allyl or substituted allyl alcohol with phosgene) is reacted with the polyol in the presence of an acid acceptor.

The poly(allyl ester) monomers of the first allyl functional monomer may be prepared by procedures well known to the skilled artisan. Typically, an ester, e.g., diethyl isophthalate, is transesterified with an allyl alcohol, e.g., unsubstituted allyl alcohol.

The first allyl functional monomer is typically present in the polymerizable composition of the present invention in an amount of at least 25 percent by weight, preferably at least 40 percent by weight, further preferably at least 45 percent by weight, and more preferably at least 50 percent by weight, percent weights being based on the total monomer weight of the composition. The first allyl functional monomer is typically present in the polymerizable composition in an amount of less than 90 percent by weight, preferably less than 70 percent by weight, and more preferably less than 60 percent by weight, percent weights being based on the total monomer weight of the composition. The first allyl functional monomer may be present in the polymerizable composition of the present invention in an amount ranging between any combination of these upper and lower values, inclusive of the recited values.

The polymerizable composition of the present invention also comprises a second allyl functional monomer, which is different than the first allyl functional monomer. The second allyl functional monomer may be prepared in accordance with those art-recognized methods as described previously herein with regard to the polyol(allyl carbonate) monomers of the first allyl functional monomer.

The second allyl functional monomer may be selected from polyether diol bis(allyl carbonate) monomers. The polyether diol of the polyether diol bis(allyl carbonate) monomer may be selected from homopolymeric polyether diols, random copolymeric polyether diols, block copolymeric polyether diols and mixtures thereof.

In an embodiment of the present invention, the polyether diol of the polyether diol bis(allyl carbonate) monomer is a block copolymeric polyether diol, which may be represented by the following general formula V,

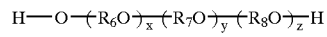

wherein $R_6O$ and $R_8O$ are the same or different; $R_7O$ is different than each of $R_6O$ and $R_8O$; $R_6O$, $R_7O$ and $R_8O$ are each independently a divalent residue of an epoxide; x and z are each independently a number from 0 to 200, provided that the sum of x and z is greater than zero; and y is a number from 3 to 200.

With further reference to general formula V, —$R_6O$— ($R_6O$), —$R_7O$—, $R_7O$) and —$R_8O$— ($R^8O$) are each independently a divalent residue of an epoxide. As used herein, the term "epoxide" refers to three membered cyclic ethers, e.g., ethylene oxide and propylene oxide. For purposes of illustration, when $R_6O$ is a residue of propylene oxide, the divalent —$R_6O$— residue may be represented by the following general formulas VI and VII,

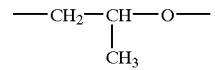

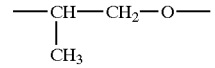

When $R_6O$ is a residue of propylene oxide, it may, more specifically, be represented by formula VI, formula VII or a combination of formulas VI and VII. Due to the steric hindrance of the pendent methyl group of propylene oxide, formula VI is believed to be the predominant representation relative to formula VII, as is known to the skilled artisan.

The —($R_6O$)$_x$—, —($R_7O$)$_y$— and —($R_8O$)$_z$ segments or blocks of general formula V, may contain one or more species of epoxide residues, preferably they each contain a single species of epoxide residues. Classes of epoxides of which $R_6O$, $R_7O$ and $R_8O$ may each independently be residues of include, but are not limited to, $C_2$–$C_{14}$ alkylene oxide, cycloalkylene oxide having from 5 to 12 carbon atoms in the ring and mixtures thereof. Examples of $C_2$–$C_{14}$ alkylene oxides include, but are not limited to, ethylene oxide, propylene oxide, (2,3-epoxypropyl)benzene, 1,2-epoxy-3-phenoxypropane, butylene oxide, e.g., 1,2-butylene oxide and 2,3-butylene oxide, pentylene oxide, e.g., 1,2-pentylene oxide and 2,3-pentylene oxide, hexylene oxide, e.g., 1,2-hexylene oxide, octylene oxide, e.g., 1,2-octylene oxide, decylene oxide, e.g., 1,2-epoxydecane, dodecylene oxide, e.g., 1,2-epoxydodecane, and epoxytetradecane, e.g., 1,2-epoxytetradecane. Examples of cycloalkylene oxide having from 5 to 12 carbon atoms in the ring include, but are not limited to, cyclopentene oxide, cyclohexene oxide, exo-2,3-epoxynorborane, cyclooctene oxide and cyclododecane epoxide. Typically, $R_6O$, $R_7O$ and $R_8O$ are each independently a divalent residue of an epoxide selected from ethylene oxide, propylene oxide, butylene oxide and mixtures thereof.

The value of subscript y of general formula V is at least 3, e.g., at least 5, 10, 15 or 20. The value of subscript y is also less than 200, e.g., less than 150, 100, 90, 80, 70, 50 or 40. The value of y may range between any combination of these numbers, inclusive of the recited numbers. When subscripts x and/or z are greater than zero, they each typically have values independently of at least 1, e.g., 2, 3, 5, 10, 15 or 20. The values of subscripts x and z are each independently less than 200, e.g., less than 150, 100, 90, 80, 70, 50 or 40. The values of x and z may each independently range between any combination of these numbers, inclusive of the recited numbers. The values of x, y and z as presented herein represent average numbers. The number average molecular weight (Mn) of the block copolymeric polyether diol represented by general formula V may range widely, for example from 190 to 20,000 or from 500 to 15,000 as determined by gel permeation chromatography.

Block copolymeric polyether diols represented by general formula V may be prepared by art recognized methods. In one method, for example, a glycol, e.g., 1,2-propane diol, is reacted with an epoxide, e.g., 1,2-propylene oxide, to form a dihydroxy terminated polyether intermediate, e.g., dihydroxy terminated poly(1,2-propylene ether). The dihydroxy terminated polyether intermediate is then further reacted with another epoxide, e.g., ethylene oxide, to form a block copolymeric polyether diol, for which with reference to general formula V, $R_7O$ is a residue of propylene oxide, and $R_6O$ and $R_8O$ are residues of the same epoxide, e.g., ethylene oxide.

Examples of block copolymeric polyether diols that may be used to prepare the polyether diol bis(allyl carbonate) monomer include, but are not limited to, poly(ethylene oxide)-b-poly(propylene oxide), poly(ethylene oxide)-b-poly(butylene oxide), poly(propylene oxide)-b-poly(butylene oxide), poly(propylene oxide)-b-poly(ethylene oxide)-b-poly(propylene oxide), poly(ethylene oxide)-b-poly(propylene oxide)-b-polyethylene oxide), poly(propylene oxide)-b-poly(ethylene oxide)-b-poly(propylene oxide), and poly(ethylene oxide)-b-poly(propylene oxide)-b-poly(butylene oxide). A preferred block copolymeric polyether diol is poly(ethylene oxide)-b-poly(propylene oxide)-b-poly(ethylene oxide).

Random copolymeric polyether diols that may be used to prepare the polyether diol bis(allyl carbonate) monomer may be prepared by methods known in the art. For example a glycol, such as ethylene glycol, is reacted with a mixture of alkylene oxides, e.g., propylene oxide and butylene oxide.

Art-recognized methods may be used to prepare the homopolymeric polyether diols of the polyether diol bis (allyl carbonate) monomer. For example a glycol, such as ethylene glycol, is reacted with an alkylene oxide, e.g., ethylene oxide. Alternatively, the homopolymeric polyether diol may be prepared from a cyclic ether other than an epoxide, e.g., tetrahydrofuran. In an embodiment of the present invention, the polyether diol of the polyether diol bis(allyl carbonate) monomer is polytetrahydrofuran diol having a number average molecular weight of from 250 to 3000.

Alkylene oxides that may be used to prepare the random copolymeric polyether diol and homopolymeric polyether diol of the polyether diol bis(allyl carbonate) may be selected from those examples as recited previously herein with regard to the block copolymeric polyether diol represented by general formula V. The Mn of the random copolymeric polyether diol and homopolymeric polyether diol of the polyether diol bis(allyl carbonate) may be selected from those values as recited previously herein with regard to the block copolymeric polyether diol represented by general formula V.

The second allyl functional monomer may also be selected from polylactone diol bis(allyl carbonate) monomers. The polylactone diol of the polylactone diol bis(allyl carbonate) monomer may be prepared by methods that are well known in the art. Typically the polylactone diol is the reaction product of a diol and a lactone. The diol of the polylactone diol may be selected from linear or branched aliphatic diols having from 2 to 20 carbon atoms, poly ($C_2$–$C_4$)alkylene glycols, cycloaliphatic diols having from 5 to 8 carbon atoms in the cyclic ring, monocyclic aromatic diols, bisphenols, hydrogenated bisphenols and mixtures thereof.

Examples of linear or branched aliphatic diols having from 2 to 20 carbon atoms that may be used to prepare the polylactone diol include but are not limited to, ethylene glycol, propylene glycol, 1,3-propane diol, 1,2- and 2,3-butane diol, pentane diols, hexane diols, heptane diols, octane diols, nonane diols, decane diols, undecane diols, dodecane diols, tridecane diols, tetradecane diols, pendadecane diols, hexadecane diols, hetadecane diols, octadecane diols, nonadecane diols and icosane diols. Examples of poly($C_2$–$C_4$)alkylene glycols include, but are not limited to, di-, tri-, tetra-, penta- and higher ethylene glycols, di-, tri-, tetra-, penta- and higher propylene glycols, and di-, tri-, tetra-, penta- and higher butylene glycols.

Cycloaliphatic diols having from 5 to 8 carbon atoms that may be used to prepare the polylactone diol include, but are not limited to, cyclopentane diol, cyclohexane diol, cyclohexane dimethanol, cycloheptane diol and cyclooctane diol. Examples of monocyclic aromatic diols that may be used to prepare the polylactone diol include but are not limited to, benzene diol, e.g., 1,2-dihydroxy benzene and 1,3-dihydroxy benzene; $C_1$–$C_4$ alkyl substituted benzene diol, e.g., 4-tert-butyl-benzene-1,2-diol, 4-methyl-benzene-1,2-diol, 3-tert-butyl-5-methyl-benzene-1,2-diol and 3,4,5,6-tetramethyl-benzene-1,2-diol; halo substituted benzene diol, e.g., 3,5-dichlorobenzene-1,2-diol, 3,4,5,6-tetrabromo-benzene-1,2-diol and 3,4,5-trichloro-benzene-1,2-diol; and $C_1$–$C_4$ alkyl and halo substituted benzene diol, e.g., 3-bromo-5-tert-butyl-benzene-1,2-diol, 3,6-dichloro-4-methyl-benzene-1,2-diol, 3,-bromo-4,5-dimethyl-benzene-1,2-diol and 3-chloro-4,6-di-tert-butyl-benzene-1,2-diol.

Bisphenols and hydrogenated bisphenols that may be used to prepare the polylactone diol of the polylactone diol bis(allyl carbonate) may be represented by the following general formula VIII,

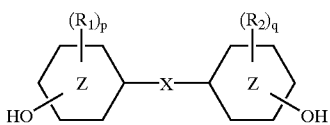

VIII wherein X, $R_1$, $R_2$, p and q are as described previously herein with regard to general formula III, and

represents a benzene ring or a cyclohexane ring. An example of a bisphenol that may be used to prepare the polylactone diol is 4,4'-isopropylidenebisphenol. An example of a hydrogenated bisphenol that may be used to prepare the polylactone diol is 4,4'-isopropylidenebiscyclohexanol.

The lactone used to prepare the polylactone diol of the polylactone diol bis(allyl carbonate) has from 3 to 8 carbon atoms in the cyclic lactone ring and may be represented by the following general formula IX,

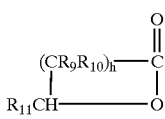

IX wherein h is an integer from 1 to 6, e.g., 1, 2, 3, 4, 5 or 6, $R_9$, $R_{10}$ and $R_{11}$ are each selected independently from hydrogen, $C_1$–$C_{12}$ alkyl, $C_5$–$C_6$ cycloalkyl, $C_1$–$C_6$ alkoxy, benzyl and phenyl, provided that at least h+2 of the total number of $R_9$, $R_{10}$ and $R_{11}$ groups are hydrogen. Typically $R_9$, $R_{10}$ and $R_{11}$ are each hydrogen.

Examples of lactones that may be used to prepare the polylactone diol of the polylactone diol bis(allyl carbonate) monomer include, but are not limited to: beta-propiolactone; gamma-butyrolactone; beta-butyrolactone; delta-valerolactone; alpha-methyl-gamma-butyrolactone; beta-methyl-gamma-butyrolactone; gamma-valerolactone; epsilon-caprolactone; monomethyl-, monoethyl-, monopropyl-, monoisopropyl- etc. through monododecyl epsilon-caprolactones; methoxy and ethoxy epsilon-caprolactones; cyclohexyl epsilon-caprolactones; phenyl epsilon-caprolactones; benzyl epsilon-caprolactones; zeta-enatholactone; and eta-caprylactone. In a preferred embodiment of the present invention, $R_9$, $R_{10}$ and $R_{11}$ are each hydrogen, h is 4 and the lactone represented by general formula IX is epsilon-caprolactone.

The polylactone diol bis(allyl carbonate) monomer may be represented by the following general formula X,

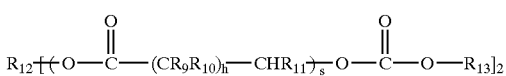

X wherein $R_9$, $R_{10}$, $R_{11}$ and h are as described previously herein with regard to general formula IX. Subscript s of general formula X is typically from 1 to 100 (e.g., from 1 to 10 or from 1 to 5), $R_{12}$ is a divalent residue of the diol used to prepare the polylactone diol, and $R_{13}$ is an allyl group (e.g., a substituted or unsubstituted allyl group as described previously herein with reference to general formula I). The polylactone diol of the polylactone diol bis(allyl carbonate) monomer typically has a number average molecular weight of from 180 to 23,000, e.g., from 200 to 2500, as determined by gel permeation chromatography.

A particularly preferred polylactone diol is the reaction product of diethylene glycol and epsilon-caprolactone, having a Mn of from 400 to 600, as determined by gel permeation chromatography. Preferred polylactone diol bis (allyl carbonate) monomers derived from the reaction product of diethylene glycol and epsilon-caprolactone may be described with further reference to general formula X, in which $R_{12}$ is a divalent residue of diethylene glycol, $R_9$, $R_{10}$, $R_{11}$ are each hydrogen, h is 4, s is from 1 to 2, and $R_{13}$ is an unsubstituted allyl group. A polylactone diol bis(allyl carbonate) monomer derived from the reaction product of diethylene glycol and epsilon-caprolactone, may be referred to more specifically as a poly(diethylene glycol/epsilon-caprolactone) diol bis(allyl carbonate) monomer.

As used herein and in the claims, with reference to the second allyl functional monomer, the terms polyether diol bis(allyl carbonate) monomer and polylactone diol bis(allyl carbonate) monomer, and more specific related terms {e.g., polytetrahydrofuran diol bis(allyl carbonate) and poly (ethylene glycol/epsilon-caprolactone) diol bis(allyl carbonate)} are intended to mean and include the named monomer or prepolymers thereof and any related monomer or oligomer species and any synthetic coproducts contained therein.

The second allyl functional monomer is typically present in the polymerizable composition of the present invention in an amount of at least 10 percent by weight, preferably at least 20 percent by weight, and more preferably at least 30 percent by weight, the percent weights being based on the total monomer weight of the composition. The second allyl functional monomer is typically present in the polymerizable composition in an amount of less than 60 percent by weight, preferably less than 55 percent by weight, and more preferably less than 50 percent by weight, the percent weights being based on the total monomer weight of the composition. The amount of second allyl functional monomer that is present in the polymerizable composition of the present invention may range between any combination of these upper and lower values, inclusive of the recited values.

In an embodiment of the present invention, the polymerizable composition further comprises a third allyl functional monomer. The third allyl functional monomer is different than each of the first and second allyl functional monomers, and is a polyol bis(allyl carbonate) monomer represented by the following general formula XI,

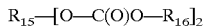

$R_{15}$—[O—C(O)O—$R_{16}$]$_2$              XI wherein $R_{11}$ is a divalent residue of a polyol selected from diethylene glycol, 1,3-propane diol, glycerol and $C_4$–$C_6$ alkane diols, and $R_{16}$, is an allyl group (e.g., a substituted or unsubstituted allyl group as described previously herein with reference to general formula I). The $R_{16}$ substituent is preferably an unsubstituted allyl group. Examples of $C_4$–$C_6$ alkane diols of which $R_{15}$ may be a residue include, but are not limited to, 1,4-butane diol, 1,5-pentane diol, 2,2-dimethyl-1,3-propane diol and 1,6-hexane diol. The third allyl functional monomer may be prepared by methods that are well known to the skilled artisan, and which have been described previously herein with reference to the first allyl functional monomer (a)(i) and general formula II.

Examples of polyol bis(allyl carbonate) monomers from which the third allyl functional monomer may be selected include, but are not limited to, diethylene glycol bis(allyl carbonate), 1,3-propane diol bis(allyl carbonate), glycerol 1,3-bis(allyl carbonate), 1,4-butane diol bis(allyl carbonate), 1,5-pentane diol bis(allyl carbonate), 2,2-dimethyl-1,3-propane diol bis(allyl carbonate), and 1,6-hexane diol bis (allyl carbonate). A preferred third allyl functional monomer is diethylene glycol bis(allyl carbonate) monomer. As used herein and in the claims, with reference to the third allyl functional monomer, the term polyol bis(allyl carbonate) monomer and more specific related terms, e.g., diethylene glycol bis(allyl carbonate), are intended to mean and include the named monomer or prepolymers thereof and any related monomer or oligomer species and any synthetic coproducts contained therein.

When used, the third allyl functional monomer is typically present in the polymerizable composition of the present invention in an amount of at least 1 percent by weight, preferably at least 10 percent by weight, and more preferably at least 20 percent by weight, the percent weights being based on the total monomer weight of the composition. The third allyl functional monomer, when used, is typically present in the polymerizable composition in an amount of less than 50 percent by weight, preferably less than 45 percent by weight, and more preferably less than 40 percent by weight, the percent weights being based on the total monomer weight of the composition. The amount of third allyl functional monomer that may be present in the polymerizable composition of the present invention may range between any combination of these upper and lower values, inclusive of the recited values.

The polymerizable composition of the present invention may be prepared by preparing separately the first, second and optional third monomers, and then mixing the separately prepared first, second and optional third monomers together, thereby forming the polymerizable composition. In another embodiment of the present invention, the first allyl functional monomer is a polyol(allyl carbonate) monomer, and the polymerizable composition is prepared by a method comprising:

(a) preparing separately a first chloroformate intermediate of the first allyl functional monomer, a second chloroformate intermediate of the second allyl functional monomer, and optionally a third chloroformate intermediate of the third allyl functional monomer;

(b) forming a mixture of the first chloroformate intermediate, the second chloroformate intermediate, and optionally the third chloroformate intermediate; and (c) reacting the chloroformate groups (—O—C(O)—Cl groups) of the mixture of the first chloroformate intermediate, second chloroformate intermediate and optionally the third chloroformate intermediate with allyl alcohol (e.g., a substituted and/or unsubstituted allyl alcohol), thereby forming the polymerizable composition.

In a further embodiment of the present invention, the third allyl functional monomer is prepared separately from the concurrent preparation of the first and second allyl functional monomers (i.e., in accordance with the above described method, in which the chloroformate groups of a mixture of the first and second chloroformate intermediates are reacted concurrently with allyl alcohol). The separately prepared third allyl functional monomer is then added to the concurrently prepared mixture of the first and second allyl functional monomers, thereby forming a polymerizable composition comprising the first, second and third allyl functional monomers.

Preparation of the chloroformate intermediates and the subsequent reaction with allyl alcohol may be conducted in accordance with art-recognized methods, e.g., as described previously herein with regard to the preparation of the polyol(allyl carbonate) monomers of the first allyl functional monomer. As is known to the skilled artisan, the reaction of chloroformate groups with allyl alcohol is typically performed in the presence of an acid scavenger, e.g., an alkali metal hydroxide, followed by washing and isolation of the resulting mixture of polyol(allyl carbonate) monomers. While the molar equivalents ratio of allyl alcohol to chloroformate groups of the mixture of chloroformate intermediates in step (c) may be less than 1:1, it is preferred that the ratio be at least 1:1 (i.e., all of the chloroformate groups are preferably reacted with allyl alcohol). In step (c) of the method of preparing the polymerizable composition, the molar equivalents ratio of allyl alcohol to chloroformate groups is typically from 1:1 to 1.5:1.0, e.g., 1.1:1.0.

For purposes of illustration, when the first allyl functional monomer is ethylene glycol bis(allyl carbonate), the first chloroformate intermediate is ethylene glycol bis (chloroformate); when the second allyl functional monomer is a poly(diethylene glycol/epsilon-caprolactone)diol bis (allyl carbonate), the second chloroformate intermediate is poly(diethylene glycol/epsilon-caprolactone)diol bis (chloroformate); and when the optional third allyl functional monomer is diethylene glycol bis(allyl carbonate), the third chloroformate intermediate is diethylene glycol bis (chloroformate). The mixture of chloroformate intermediates may be formed according to methods that are well known to the skilled artisan, e.g., by mixing with an impeller under an inert atmosphere, such as a nitrogen.

Polymerization of the polymerizable composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable compositions.

Suitable examples of organic peroxy compounds, that may be used as initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate. A preferred initiator is diisopropyl peroxydicarbonate.

The amount of initiator used to initiate and polymerize the polymerizable compositions of the present invention may vary and will depend on the particular initiator used. Only that amount that is required to initiate and sustain the polymerization reaction is required, i.e., an initiating amount. With respect to the preferred peroxy compound, diisopropyl peroxydicarbonate, typically between 2.0 and 5.0 parts of that initiator per 100 parts of monomer (phm) may be used. More usually, between 2.5 and 4.0 phm is used to initiate the polymerization. The amount of initiator and the consequent cure cycle should be adequate to produce a polymerizate having a 0 second Barcol 935 hardness (i.e., as measured using a Model No. 935 Barcol Impressor) of at least 65, preferably at least 70, e.g., from 70 to 80. Typically, the cure cycle involves heating the polymerizable organic composition in the presence of the initiator from room temperature to 94° C. over a period of from 15 hours to 30 hours.

Various conventional additives may be incorporated into the polymerizable composition of the present invention. Such conventional additives may include light stabilizers, heat stabilizers, ultraviolet light absorbers, mold release agents, such as internal mold release agents, pigments and flexibilizing additives that are not radically polymerizable, e.g., alkoxylated phenol benzoates and poly(alkylene glycol) dibenzoates. Conventional additives are typically present in the compositions of the present invention in amounts totaling less than 10 percent by weight, more typically less than 5 percent by weight, and commonly less than 3 percent by weight, based on the total weight of the polymerizable composition.

Polymerizates obtained from polymerization of polymerizable organic compositions of the present invention are solid and preferably transparent or optically clear so that they may be used for optical lenses, such as plano and ophthalmic lenses, sun lenses, windows, automotive transparencies, e.g., windshields, T-roofs, sidelights and backlights, and for aircraft transparencies, etc. When used to prepare photochromic articles, e.g., photochromic lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include: (a) dissolving or dispersing the substance within the polymerizate, e.g., imbibition of the photochromic substance into the polymerizate by immersion of the polymerizate in a hot solution of the photochromic substance or by thermal transfer; (b) providing the photochromic substance as a separate layer between adjacent layers of the polymerizate, e.g., as a part of a polymer film; and (c) applying the photochromic substance as part of a coating placed on the surface of the polymerizate.

Preferably, photochromic substances are incorporated into the polymerizates, and in particular, substantially completely cured polymerizates of the present invention by means of imbibition. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substances) is incorporated or applied.

The present invention is more particularly described in the following examples, which are intended to be illustrative only, since numerous modifications and variations therein will be apparent to those skilled in the art. Unless otherwise specified, all parts and all percentages are by weight.

SYNTHESIS EXAMPLES A–D

Example A

An ethylene glycol bis(chloroformate) intermediate was prepared from the ingredients as summarized in the following Table A. The ethylene glycol bis(chloroformate) intermediate is useful in the preparation of ethylene glycol bis(allyl carbonate) monomer.

TABLE A

| Ingredients | Weight (grams) |
|---|---|
| Charge 1 | |
| phosgene | 33 |
| Charge 2 | |
| ethylene glycol | 124 |
| Charge 3 | |
| phosgene | 412 |
| Charge 4 | |
| phosgene | 74 |

Charge 1 was added over a period of 15 minutes to a 1 liter four-necked round-bottom jacketed flask with concurrent cooling to 5° C. The flask was equipped with a motor driven TEFLON polymer stir blade, a phosgene inlet tube, a thermocouple, pressure equalizing addition funnel, and a cold condenser connected to a sodium hydroxide scrubber. With the completion of the addition of Charge 1, Charges 2 and 3 were each added to the flask simultaneously over a period of 5 hours and 4.6 hours respectively. During the addition of Charges 2 and 3, the temperature of the contents of the flask were observed to rise to no more than 18° C. At the end of the addition of Charge 2, the contents of the flask were stirred for 15 minutes followed by the addition of Charge 4 over a period of an additional 15 minutes. With the completion of the addition of Charge 4, the contents of the flask were sparged with nitrogen gas at a temperature ranging from 27° C. to 30° C. for a period of approximately 24 hours. The contents of the flask were transferred to a suitable container. The assay of the reaction was determined to be 96 percent, based on titration of a mixture of the product and pyridine.

Example B

Ethylene glycol bis(allyl carbonate) monomer was prepared from the ingredients as summarized in the following Table B. The ethylene glycol bis(allyl carbonate) monomer was used in polymerizable compositions 1–3, as described in further detail herein.

TABLE B

| Ingredients | Weight (grams) |
|---|---|
| Charge 1 | |
| ethylene glycol bis (chloroformate) intermediate (a) | 243 |
| allyl alcohol | 176 |
| diallyl carbonate | 29 |
| Charge 2 | |
| 50 percent sodium hydroxide (b) | 244 |

(a) The ethylene glycol bis(chloroformate) intermediate was prepared according to the method described in Example A.

(b) An aqueous solution containing sodium hydroxide in an amount of 50 percent by weight, based on the total weight of the solution.

The ingredients of Charge 1 were added to a 1 liter round-bottom jacketed glass flask, which was equipped with a motor driven TEFLON polymer stir blade, water cooled condenser, a circulating cooling unit (for the jacket of the flask) and a thermometer connected through a temperature feedback control device. The contents of the flask were cooled to −9° C. and Charge 2 was added slowly over a period of 1 hour and 10 minutes. Throughout the addition of Charge 2, the temperature of the contents of the flask was not observed to exceed 15° C. Upon completing the addition of Charge 2, the contents of the flask were allowed to warm to and stir at approximately 25° C. for an addition 2.5 hours. The contents of the flask were separated into organic and aqueous phases by the addition of 500 milliliters (ml) of water and 200 ml of methylene chloride to the flask. The organic phase was collected and washed twice with approximately 1500 ml of deionized water. The washed organic phase was stripped at a temperature of 105° C. under a vacuum of 10 millimeters (mm) of mercury, and filtered through activated carbon.

The resulting product monomer of Example B was obtained in 74 percent yield, and was found to contain 92 percent ethylene glycol bis(allyl carbonate) monomer, based on an analysis by high pressure liquid chromatography and a comparison of peak areas.

Example C

A polylactone diol bis(chloroformate) intermediate was prepared from the ingredients as summarized in Table C. The polycaprolactone diol bis(chloroformate) intermediate is useful in the preparation of polycaprolactone diol bis(allyl carbonate) monomers.

TABLE C

| Ingredients | Weight (grams) |
|---|---|
| Charge 1 | |
| phosgene | 67 |
| Charge 2 | |
| polylactone diol (c) | 3993 |
| Charge 3 | |
| phosgene | 1713 |

(c) TONE 0201 poly(epsilon-caprolactone) diol obtained from Union Carbide.

Charge 1 was added over a period of 15 minutes to a 5 liter four-necked round-bottom jacketed flask with concurrent cooling to 5° C. The flask was equipped with a motor driven TEFLON polymer stir blade, a phosgene inlet tube, a thermocouple, pressure equalizing addition funnel, and a cold condenser connected to a sodium hydroxide scrubber. With the completion of the addition of Charge 1, Charges 2 and 3 were each added to the flask simultaneously over a period of 8.5 hours and 7.5 hours respectively. During the addition of Charges 2 and 3, the temperature of the contents of the flask were observed to rise to no more than 38° C. At the end of the addition of Charge 2, a heating mantle was placed on the flask, and the contents of the flask were maintained at a temperature of 32° C. throughout the rest of the addition of Charge 3. With the completion of the addition of Charge 3, the contents of the flask were sparged at a temperature of 32° C. with nitrogen gas for a period of approximately 24 hours. The contents of the flask were transferred to a suitable container. The assay of the reaction was determined to be 99 percent, based on a titration of a mixture of the product and pyridine.

Example D

A Polylactone diol bis(allyl carbonate) monomer was prepared from the ingredients summarized in the following Table D. The polylactone diol bis(allyl carbonate) monomer was used in a polymerizable composition according to the present invention, as described in Examples 2 and 3.

TABLE D

| Ingredients | Weight (grams) |
| --- | --- |
| Charge 1 | |
| polycaprolactone bis(chloroformate) intermediate (d) | 328 |
| allyl alcohol | 68 |
| diallyl carbonate | 39 |
| Charge 2 | |
| 50 percent sodium hydroxide (b) | 94 |

(d) The polylactone bis(chloroformate) intermediate was prepared according to the method described in Example C.

Charge 1 was added to a 1 liter round-bottom jacketed glass flask, which was equipped with a motor driven TEFLON polymer blade, water cooled condenser, a circulating cooling unit (for the jacket of the flask) and a thermometer connected through a temperature feed-back control device. The contents of the flask were cooled to −9° C. and Charge 2 was added slowly over a period of 1 hour. Throughout the addition of Charge 2, the temperature of the contents of the flask was not observed to exceed 25° C. Upon completing the addition of Charge 2, the contents of the flask were stirred for an additional 2 hours at a temperature of approximately 25° C. The contents of the flask were separated into organic and aqueous phases by the addition of 600 milliliters (ml) of deionized water to the flask. The organic phase was collected and washed twice with approximately 1200 ml of deionized water. The washed organic phase was stripped at a temperature of 110° C. under a vacuum of 10 millimeters (mm) of mercury, and filtered through activated carbon.

The resulting product monomer of Example D was obtained in 74 percent yield, and was found to have an iodine value of 66 grams of iodine per 100 grams of monomer sample.

Polymerizable Composition Examples 1–3

Table 1 summarizes two polymerizable monomer compositions. Example 1 is a comparative example. Examples 2 and 3 are representative of embodiments of the present invention. The level of diisopropyl peroxydicarbonate used in each of examples 1–3 was selected so that the polymerizates obtained therefrom were substantially completely cured.

TABLE 1

| | Parts by weight | | |
| --- | --- | --- | --- |
| Ingredients | Example 1 | Example 2 | Example 3 |
| ethylene glycol bis(allyl carbonate) monomer of Example B | 100 | 55 | 35 |
| polylactone diol bis(allyl carbonate) monomer of Example D | 0 | 45 | 35 |
| diethylene glycol bis(allyl carbonate) monomer (e) | 0 | 0 | 30 |
| diisopropyl peroxydicarbonate | 2.8 | 2.8 | 2.8 |

(e) CR-39® monomer, commercially available from PPG Industries, Inc.

Cast sheets of the polymerizable monomer compositions of Table 1 were made in the following manner. Each monomer composition was transferred to a suitable vessel and the designated amount of di-isopropyl peroxydicarbonate was added. The resulting initiated polymerizable monomer composition was mixed using a magnetic stir plate and magnetic stir bar at a temperature of 4° C. The initiated monomer composition was then filtered through a 0.45 micron MAGNA nylon filter using a 316 stainless steel 1.5 liter pressure filter holder, under 20 pounds per square inch (138 kPa) of nitrogen gas. The resulting filtered composition was then poured into glass molds having interior dimensions of, 15.24×15.24×0.32 cm.

The filled molds were then placed in a heated water bath and cured using the following 5-stage cure cycle: (1) isothermal hold at 38° C. for 6 hours; (2) linear temperature increase from 38° C. and 60° C. over a period of 8 hours; (3) linear temperature increase from 60° C. to 94° C. over a period of 7.5 hours; (4) linear temperature decrease from 94° C. to 82° C. over a period of 1.5 hours; and (5) removal from the water bath and cooling to room temperature followed by demolding. Physical properties of the sheets were measured and the results are tabulated in Table 2.

TABLE 2

| | Physical Data | | |
| --- | --- | --- | --- |
| Physical Test | Cast Sheet of Example 1 | Cast Sheet of Example 2 | Cast Sheet of Example 3 |
| Percent Transmittance (f) | 91.0 | 93.8 | 93.6 |
| a* (g) | −0.4 | −0.1 | −0.1 |
| b* (g) | +4.4 | +0.5 | +0.6 |
| Density at 25° C. (g/cc) | 1.34 | 1.29 | 1.27 |
| Barcol 934 Hardness (0 seconds) (h) | 53 | N.D.[1] | N.D.[1] |
| Barcol 934 Hardness (15 seconds) (h) | 51 | N.D.[1] | N.D.[1] |
| Barcol 935 Hardness (0 seconds) (i) | 92 | 71 | 72 |
| Heat Distortion Temperature (° C. at 10 mils) (j) | Not Detected (k) | 45 | 43 |

TABLE 2-continued

| | Physical Data | | |
|---|---|---|---|
| Physical Test | Cast Sheet of Example 1 | Cast Sheet of Example 2 | Cast Sheet of Example 3 |
| Total Deflection (mils at 130° C.) (l) | 0 | 22 | 40 |
| Fischer Microhardness (N/mm²) (m) | 186 | 52 | 47 |

[1]N.D. = Not Determined. The cast sheets of Examples 2 and 3 were too soft for analysis by a Model No. 934 Barcol Impressor, and as such, Barcol 935 hardness data was obtained therefrom using a Model No. 935 Barcol Impressor.

(f) Percent transmittance was determined in accordance with ASTM D 1003, using a Hunter Lab model D25P-9 calorimeter employing a Lumen C light source.

(g) a* (redness-greenness) and b* (yellowness-blueness) values were determined in accordance with ASTM D 1925-70, using a Hunter Lab model D25P-9 calorimeter employing a Lumen C light source. Positive a* values indicate redness, negative a* values indicate greenness, positive b* values indicate yellowness, and negative b* values indicate blueness.

(h) Barcol 934 Hardness was determined in accordance with ASTM D 2583-92 (using a Model No. 934 Barcol Impressor), taking scale readings immediately after the Barcol impresser point penetrated the specimen, and 15 seconds thereafter.

(i) Barcol 935 Hardness was determined using a Model No. 935 Barcol Impressor, taking scale readings immediately after the Barcol impresser point penetrated the specimen.

(j) The Heat Distortion Temperature was measured, at a deflection of 254 microns (10 mils), in accordance with ASTM D 648-86 using a Custom Scientific Instruments Model HDV3 DTUL/Vicat Softening Point Apparatus.

(k) No distortion was detected for the cast sheet of Example 1 up to a temperature of 13° C.

(l) Total Deflection at 130° C. was determined in accordance with ASTM D 648-86 using a Custom Scientific Instruments Model HDV3 DTUL/Vicat Softening Point Apparatus.

(m) Fischer Microhardness (in units of Neutons per square millimeter) was determined using a FISCHERSCOPE® H100 microhardness testing system from Helmut Fischer GmbH, in accordance with the manufacturers operating instructions.

The data of Table 2 demonstrates that polymerizates obtained from a polymerizable monomer compositions according to the present invention (e.g., Examples 2 and 3) have a heat distortion temperature of at least 40° C. In addition, the data of Table 2 shows that a polymerizate of the first allyl functional monomer alone, e.g., ethylene glycol bis(allyl carbonate), has a 15 second Barcol 934 hardness of at least 40 (Example 1).

Photochromic Article Examples 4–6

Additional test samples were cut from the cast sheets prepared from polymerizable compositions of Examples 1–3, as described previously herein. Example 4 represents an attempt to imbibe a sheet cast from the polymerizable composition of Example 1. Examples 5 and 6 represent sheets cast from the polymerizable compositions of Examples 2 and 3 respectively, that were each successfully imbibed with photochromic substance. The test samples were imbibed with a resin solution containing 40 percent by weight of PHOTOSOL® 7-219 photochromic substance, 16 percent by weight of PHOTOSOL® 7-330 photochromic substance and 44 percent by weight of PHOTOSOL® 7-232 photochromic substance, the percent weights being based on the total weight of photochromic substances present in the resin solution. The PHOTOSOL® 7-219, PHOTOSOL® 7-330 and PHOTOSOL® 7-232 materials are naphthopyran photochromic substances available commercially from PPG Industries, Inc.

Resin solutions of the photochromic substances were spin coated onto one side of the test sample sheets. The coated test sheets were then allowed to dry under an infrared lamp for 20 minutes followed by heating for 5 hours in a forced air oven set at 135° C. The imbibed test samples were removed from the oven and allowed to cool to room temperature. The imbibed test samples were then thoroughly washed with 32° C. water to remove the resin solution.

Photochromic performance data for the imbibed test sheets were determined through use of an optical bench. Prior to testing on the optical bench, the imbibed test sheets were exposed to 365 nanometer ultraviolet light for about 15 minutes to activate the photochromic compounds and then placed in a 76° C. oven for about 15 minutes to bleach or inactivate the photochromic substances. The imbibed test sheets were then cooled to room temperature, exposed to fluorescent room lighting for at least 2 hours and then kept covered for at least 2 hours prior to testing on an optical bench maintained at 23.9° C.

The optical bench was equipped with a 300 watt Xenon arc lamp operated at about 200 watts, a remote controlled shutter, a Schott WG-320 nm cut off filter, which removes short wavelength radiation, neutral density filter(s) and a constant temperature water bath in which the sample to be tested was immersed. A collimated beam of light from a tungsten lamp was passed through the test sample at a small angle to the normal of the center of the test sample. After passing through the test sample, the light from the tungsten lamp impinged a beam splitter which split the beam into two secondary beams of equal intensity. The reflected secondary beam was directed through a 480 nm band pass filter to a detector. The unreflected secondary beam was directed through a 620 nm band pass photopic filter to a detector. The photopic filter passes wavelengths such that the detector mimics the response of the human eye. The output signals from the detector(s) were processed by a radiometer which delivered data to a computer. The following Table 3 lists photochromic performance data obtained from the imbibed test sheets.

TABLE 3

| | Photochromic Performance | | |
|---|---|---|---|
| Test | Example 4 | Example 5 | Example 6 |
| Net Absorbance at 390 nm (n) | N.D.[2] | 1.3 | 1.1 |
| ΔOD (o) (15 minutes, 23° C.) | N.D.[2] | 0.62 | 0.63 |
| Bleach Half Life ($t_{1/2}$, seconds) (p) | N.D.[2] | 55 | 62 |

[2]N.D. = Not Determined. Sheet cast from the polymerizable composition of Example 1 could not be imbibed to any appreciable extent, and as such photochromic performance data relative to Example 4 was not determined.

(n) Net Absorbance at 390 nm, (viz., absorbance of the imbibed lens in the bleached state minus the absorbance of the uncoated lens) was determined at room temperature using a Varian Model Cary 3 spectrophotometer.

(o) Change in optical density (ΔOD) was determined on the optical bench by inserting an imbibed lens, in the bleached state, into the sample holder, adjusting the transmittance scale to 100%, opening the shutter from the Xenon lamp to provide ultraviolet radiation to change the test square from the bleached state to an activated (i.e., substantially darkened) state, measuring the transmittance in the activated state, and calculating the change in optical density according the formula ΔOD=log(100/%Ta) where %Ta is the percent transmittance in the activated state and the logarithm is to the base 10. The period of exposure to the ultraviolet light from the Xenon lamp at the time the percent transmittance is determined, and the temperature of the water bath, are both noted.

(p) The Bleach Half Life ($T_{1/2}$) is the time interval in seconds for the absorbance of the activated form of the imbibed lens to reach one half the highest absorbance at 23° C. after removal of the source of activating light.

The data of Table 4 shows that photochromic articles made from substantially completely cured polymerizates of the present invention have improved organic photochromic substance incorporation and good photochromic performance properties compared to substantially completely cured polymerizates prepared from the first allyl functional monomer alone, e.g., ethylene glycol bis(allyl carbonate) monomer.

The present invention has been described with reference to specific details of particular embodiments thereof. It is not intended that such details be regarded as limitations upon the scope of the invention except insofar as and to the extent that they are included in the accompanying claims.

We claim:

1. A polymerizable composition comprising:

(a) a first allyl functional monomer having at least two allyl groups, said first allyl functional monomer being selected such that a substantially completely cured polymerizate of said first allyl functional monomer has a 15 second Barcol 934 hardness of at least 40; and (b) a second allyl functional monomer, which is different from said first allyl functional monomer and is selected from,
  (i) polyether diol bis(allyl carbonate);
  (ii) polylactone diol bis(allyl carbonate); and
  (iii) mixtures of (i) and (ii), wherein said second allyl functional monomer (b) is present in said polymerizable composition in an amount to provide a substantially completely cured polymerizate of said composition having improved organic photochromic substance incorporation relative to a substantially completely cured polymerizate of said composition free of (b), and heat distortion temperature of at least 40° C.

2. The polymerizable composition of claim 1 wherein said first allyl functional monomer (a) is selected from (a)(i) an allyl functional monomer represented by the following general formula,

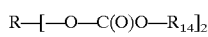

R—[—O—C(O)O—R$_{14}$]$_2$ wherein R is a divalent residue of a diol selected from 1,2-ethane diol and 1,2-propane diol, and $R_{14}$ is an allyl group;

(a)(ii) an allyl functional monomer represented by the following general formula,

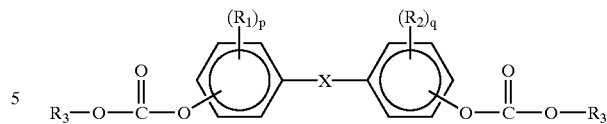

wherein $R_1$ and $R_2$ are each selected independently from each other and independently for each p and q from $C_1$–$C_4$ alkyl, chlorine and bromine, p and q are each independently an integer from 0 to 4, and —X— is a divalent linking group selected from —O—, —S—, —S(O$_2$)—, —C(O)—, —CH$_2$—, —CH=CH—, —C(CH$_3$)$_2$—, —C(CH$_3$)(C$_6$H$_5$)— and

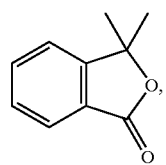

and $R_3$ is an allyl group;

(a)(iii) an allyl functional monomer represented by the following general formula,

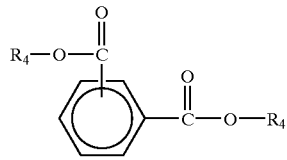

wherein $R_4$ is an allyl group; and (a)(iv) mixtures at least two of (a)(i), (a)(ii) and (a)(iii).

3. The polymerizable composition of claim 1 wherein the polyether diol of the polyether diol bis(allyl carbonate) (b)(i) is selected from homopolymeric polyether diols, random copolymeric polyether diols, block copolymeric polyether diols and mixtures thereof.

4. The polymerizable composition of claim 1 wherein the polylactone diol of the polylactone diol bis(allyl carbonate) (b)(ii) is the reaction product of a diol and a lactone.

5. The polymerizable composition of claim 4 wherein the diol of the polylactone diol is selected from linear or branched aliphatic diols having from 2 to 20 carbon atoms, poly($C_2$–$C_4$)alkylene glycols, cycloaliphatic diols having from 5 to 8 carbon atoms in the cyclic ring, monocyclic aromatic diols, bisphenols, hydrogenated bisphenols and mixtures thereof; and the lactone of the polylactone diol is selected from at least one lactone having from 3 to 8 carbon atoms in the cyclic lactone ring.

6. The polymerizable composition of claim 5 wherein said lactone is epsilon-caprolactone.

7. The polymerizable composition of claim 1 wherein said first allyl functional monomer (a) is present in said composition in an amount of from 40 percent by weight to 90 percent by weight, based on the total monomer weight of said composition, and said second allyl functional monomer (b) is present in said composition in an amount of from 10 percent by weight to 60 percent by weight, based on the total monomer weight of said composition.

8. The polymerizable composition of claim 2 wherein said first allyl functional monomer (a) is allyl functional monomer (a)(i) for which R is a residue of 1,2-ethane diol, and said second allyl functional-monomer (b) is polylactone diol bis(allyl carbonate).

9. The polymerizable composition of claim 8 wherein the polylactone diol of the polylactone diol bis(allyl carbonate) (b)(ii) is the reaction product of a diol and a lactone; the diol of the polylactone diol is selected from linear or branched aliphatic diols having from 2 to 20 carbon atoms, poly ($C_2$–$C_4$)alkylene glycols, cycloaliphatic diols having from 5 to 8 carbon atoms in the cyclic ring, hydrogenated bisphenols and mixtures thereof; and the lactone of the polylactone diol is selected from at least one lactone having from 3 to 8 carbon atoms in the cyclic lactone ring.

10. The polymerizable composition of claim 9 wherein the diol of the polylactone diol is diethylene glycol, and the lactone of the polylactone diol is epsilon-caprolactone.

11. The polymerizable composition of claim 10 wherein the polylactone diol of said polylactone diol bis(allyl carbonate) has a number average molecular weight of from 400 to 600.

12. The polymerizable composition of claim 1 wherein said first allyl functional monomer is a polyol(allyl carbonate) monomer, and said polymerizable composition is prepared by a method comprising:
   (a) preparing separately a first chloroformate intermediate of said first allyl functional monomer, and a second chloroformate intermediate of said second allyl functional monomer;
   (b) forming a mixture of said first and second chloroformate intermediates; and
   (c) reacting the chloroformate groups of said mixture of said first and second chloroformate intermediates with allyl alcohol, thereby forming said polymerizable composition.

13. A polymerizable composition comprising:
   (a) a first allyl functional monomer having at least two allyl groups, said first allyl functional monomer being selected such that a substantially completely cured polymerizate of said first allyl functional monomer has a 15 second Barcol 934 hardness of at least 40;
   (b) a second allyl functional monomer, which is different from said first allyl functional monomer and is selected from,
      (i) polyether diol bis(allyl carbonate);
      (ii) polylactone diol bis(allyl carbonate); and
      (iii) mixtures of (i) and (ii); and
   (c) a third allyl functional monomer that is different than each of said first and second allyl functional monomers; said third allyl functional monomer being represented by the following general formula,

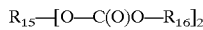

$R_{15}$ is a divalent residue of a polyol selected from diethylene glycol, 1,3-propane diol, glycerol and $C_4$–$C_6$ alkane diols, and $R_{16}$ is an allyl group,
wherein said second allyl functional monomer (b) is present in said polymerizable composition in an amount to provide a substantially completely cured polymerizate of said composition having improved organic photochromic substance incorporation relative to a substantially completely cured polymerizate of said composition free of (b), and heat distortion temperature of at least 40° C.

14. The polymerizable composition of claim 13 wherein said first allyl functional monomer is present in said composition in an amount of from 25 percent by weight to 90 percent by weight, based on the total monomer weight of said composition; said second allyl functional monomer is present in said composition in an amount of from 10 percent by weight to 60 percent by weight, based on the total monomer weight of said composition; and said third allyl functional monomer is present in said composition in an amount of from 1 percent by weight to 50 percent by weight, based on the total monomer weight of said composition.

15. The polymerizable composition of claim 14 wherein $R_{15}$ is a residue of diethylene glycol.

16. The polymerizable composition of claim 13 wherein said first allyl functional monomer (a) is represented by the following general formula,

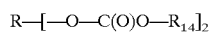

wherein R is a divalent residue of a diol selected from 1,2-ethane diol and 1,2-propane diol, and $R_{14}$ is an allyl group; and said second allyl functional monomer (b) is polylactone diol bis(allyl carbonate) (b)(ii).

17. The polymerizable composition of claim 16 wherein the polylactone diol of the polylactone diol bis(allyl carbonate) (b)(ii) is the reaction product of a diol and a lactone; the diol of the polylactone diol is selected from linear or branched aliphatic diols having from 2 to 20 carbon atoms, poly($C_2$–$C_4$)alkylene glycols, cycloaliphatic diols having from 5 to 8 carbon atoms in the cyclic ring, hydrogenated bisphenols and mixtures thereof; and the lactone of the polylactone diol is selected from at least one lactone having from 3 to 8 carbon atoms in the cyclic lactone ring.

18. The polymerizable composition of claim 17 wherein the diol of the polylactone diol is diethylene glycol, and the lactone of the polylactone diol is epsilon-caprolactone.

19. The polymerizable composition of claim 13 wherein said first allyl functional monomer is a polyol(allyl carbonate) monomer, and said polymerizable composition is prepared by a method comprising:
   (a) preparing separately a first chloroformate intermediate of said first allyl functional monomer, a second chloroformate intermediate of said second allyl functional monomer, and a third chloroformate intermediate of said third allyl functional monomer;
   (b) forming a mixture of said first, second and third chloroformate intermediates; and
   (c) reacting the chloroformate groups of said mixture of said first, second and third chloroformate intermediates with allyl alcohol, thereby forming said polymerizable composition.

20. The polymerizate of claim 1.

21. The polymerizate of claim 10.

22. The polymerizate of claim 13.

23. A photochromic article comprising:
   (a) the polymerizate of claim 1; and
   (b) a photochromic amount of organic photochromic substance.

24. A photochromic article comprising:
   (a) the polymerizate of claim 10; and
   (b) a photochromic amount of organic photochromic substance.

25. The photochromic article of claim 24 wherein the organic photochromic substance is selected from the group consisting of spiro(indoline)naphthoxazines, spiro(indoline) benzoxazines, benzopyrans, naphthopyrans, chromenes, organo-metal dithizonates, fulgides and fulgimides and mixtures of such organic photochromic substances.

* * * * *